United States Patent
Sawada

(10) Patent No.: US 7,499,770 B2
(45) Date of Patent: Mar. 3, 2009

(54) DATA PROCESSING DEVICE WITH COOLING FAN

(75) Inventor: Ryoji Sawada, Osaka (JP)

(73) Assignee: Kyocera Mita Corporation, Osaka (JP)

(*) Notice: Subject to any disclaimer, the term of this patent is extended or adjusted under 35 U.S.C. 154(b) by 22 days.

(21) Appl. No.: 11/287,344

(22) Filed: Nov. 28, 2005

(65) Prior Publication Data

US 2006/0117205 A1    Jun. 1, 2006

(30) Foreign Application Priority Data

Nov. 30, 2004    (JP)    .............................. 2004-347497

(51) Int. Cl.
*G06F 19/00* (2006.01)
*G05D 3/00* (2006.01)
*H01H 43/00* (2006.01)

(52) U.S. Cl. .................... 700/304; 361/687; 361/695; 702/132

(58) Field of Classification Search ............... 700/304; 361/687, 695; 702/132
See application file for complete search history.

(56) References Cited

U.S. PATENT DOCUMENTS

| | | | | |
|---|---|---|---|---|
| 5,752,011 A * | 5/1998 | Thomas et al. | ............... | 713/501 |
| 5,974,557 A * | 10/1999 | Thomas et al. | ............... | 713/322 |
| 6,082,623 A * | 7/2000 | Chang | ....................... | 236/49.3 |
| 6,243,656 B1 * | 6/2001 | Arai et al. | ................... | 702/132 |
| 6,336,080 B1 * | 1/2002 | Atkinson | ..................... | 702/132 |
| 6,470,456 B1 * | 10/2002 | Chung-Chih | ................ | 713/322 |
| 7,275,248 B2 * | 9/2007 | Nishida | ....................... | 718/100 |
| 2002/0062454 A1 * | 5/2002 | Fung | ........................... | 713/300 |

FOREIGN PATENT DOCUMENTS

| | | |
|---|---|---|
| JP | 01-303511 A | 12/1989 |
| JP | 05-324141 A | 12/1993 |
| JP | 11-345135 | 12/1999 |
| JP | 2000-010660 A | 1/2000 |
| JP | 2004-6446 | 1/2004 |

OTHER PUBLICATIONS

"Temperature-Aware Operating System Scheduling" -Eugene Otto, STS 402 Thesis, Mar. 31, 2006.*
"Using On-Chip Event counters for high-resolution, real-time temperature measurement" -Chung et al, University of Virginia Department of Computer Science. Date Unknown.*

* cited by examiner

Primary Examiner—Michael D Masinick
(74) Attorney, Agent, or Firm—Westerman, Hattori, Daniels & Adrian, LLP.

(57) ABSTRACT

To provide a data processing device with cooling fan capable of executing data processing by using a processor which always works within the maximum range of its specifications.

In the data processing device with cooling fan 3 for cooling down the processor 1 that performs data processing, the device includes: a working rate calculating section 4 for calculating the working rate of the processor 1; and a control section 5 for activating the cooling fan 3 when the value of the working rate reaches or exceeds a predetermined reference value.

1 Claim, 1 Drawing Sheet

DATA PROCESSING DEVICE WITH COOLING FAN

BACKGROUND OF THE INVENTION

1. Field of the Invention

The present invention relates to a data processing device with a cooling fan to prevent the temperature rise of the processor performing data processing.

2. Description of the Related Art

Conventionally, in order to perform stable data processing it has been necessary to prevent temperature rise in processors formed from semiconductor. For this purpose a cooling fan has generally been considered appropriate.

Further, as a conventional art, a technique where the temperature rise in the package of semiconductor circuit is suppressed to prevent thermorunaway is disclosed as shown for example in Japanese Patent Laid-Open No. 2004-6446 publication (paragraphs [0048] to [0052], [0059], FIG. 3). This technique is to detect the temperature of a function module substrate as an electric signal, to control the frequency of the system clock signal of the processor by using the detected signal, and to control the processor such that it operates at the maximum speed at which thermorunaway does not occur. Specifically, a temperature monitor is provided to detect the temperature of the substrate or a predetermined region of the substrate. The temperature monitor makes use of the temperature characteristics of the transmitting frequency of a ring transmitter. The ring transmitter is a transmitter with odd numbers of inverting amplifier circuits connected in a ring state, and its transmitting frequency is determined by the operating speed of transistors that constitute each inverting amplifier circuit. The operating speed of transistor has the characteristic that it becomes faster as the temperature of a junction surface gets lower and it becomes slower as the temperature gets higher. The temperature of package is monitored in this manner, and when the temperature reaches the reference temperature, the operating state of the microprocessor is changed such that the power consumption of the microprocessor is limited to a predetermined value.

Further, as a conventional art, a technique is disclosed in which the load state of the processor is detected to distinguish whether or not interruption conditions are satisfied and the optimum processing can be executed based on processor load, as shown for example in Japanese Patent Laid-Open No. 11-345135 publication (paragraphs [0009] to [0015], [0026] to [0041]). Processor load factor is detected by this conventional art. In this detection method, since idle signals are output when no processing is executed inside the processor, that is, during an idle period, the idle period ratio in one measurement period is found by measuring the idle signals for a predetermined time by using the idle signal and a processor clock, and the processor load factor during the predetermined time is found from the result. The processor is designed to activate on a data processing state based on the processor load factor.

However, in the conventional art shown in the above-described Japanese Patent Laid-Open No. 2004-6446, since its construction is such that the detection section for detecting temperature is fixed on the substrate, it is necessary to specially prepare the detection section and to assemble it on the substrate. Further, the substrate temperature does not only depend on the operating state of the semiconductor integrated circuit but is also affected by the environment inside the electronic device in which the circuit is arranged. For example, when electronic parts with a large calorific power are closely arranged, the substrate temperature is largely affected by the calorific power of the electronic parts, and it becomes impossible to accurately detect the temperature of the processor itself. As a result, the substrate temperature is higher than the processor temperature, and suppressing the frequency of the system signal of the processor based on the measured result of the temperature means that the processor is allowed to operate on a significantly low state compared to its optimum function. Therefore, there has been a problem that the processor has not always been used at an appropriate efficiency. Although it is natural to consider frequency correction, setting the correction amount accurately in advance is problematic.

SUMMARY OF THE INVENTION

Consequently, the inventors of the present invention have found a method of solving the above-described problems by making use of the existing conventional art where the load factor is calculated from the idle signal, which is shown in the above-described Japanese Patent Laid-Open No. 11-345135. Specifically, it is the object of the present invention to provide a data processing device with a cooling fan, which is capable of executing data processing by always using the processor within the maximum range of its specifications.

To solve the problems, the invention according to the first aspect of the present invention is a data processing device with a cooling fan to cool down the processor that performs data processing, in which the device includes: a working rate calculating means for calculating the working rate of the processor; and a control means for activating the cooling fan when the value of the working rate reaches or exceeds a predetermined reference value.

Further, the invention according to the second aspect of the present invention is the data processing device of the first aspect of the present invention, in which the means of calculating the working rate consists of an idle signal counter that counts idle signals generated in the processor, an accumulation counter that accumulates count values from the idle signal counter during a predetermined period, and a working rate calculating circuit that calculates the working rate from a count value of the accumulation counter and transmits the calculation data.

The invention according to the third aspect of the present invention is a data processing device with a cooling fan to cool down the processor that performs data processing, in which the said device includes: a working rate calculating means for calculating the working rate of the processor; a control means for activating the cooling fan when the value of the said working rate reaches or exceeds a predetermined reference value; and a changing means for changing the reference value for said working rate from the operation start point of the data processing until said predetermined time passes, which forms setting conditions for starting activation of the cooling fan, to a value larger than the reference value for said working rate after the predetermined time has passed.

Further, the invention according to the fourth aspect of the present invention is the data processing device of the third aspect of the present invention, in which said working rate calculating means is made up of an idle signal counter that counts said idle signals generated in the processor, an accumulation counter that accumulates count values of said idle signal counter for a predetermined period, and a working rate calculating circuit that calculates said working rate from the count value of the accumulation counter and transmits the calculation data.

DESCRIPTION OF THE PREFERRED EMBODIMENTS

Figure 1:
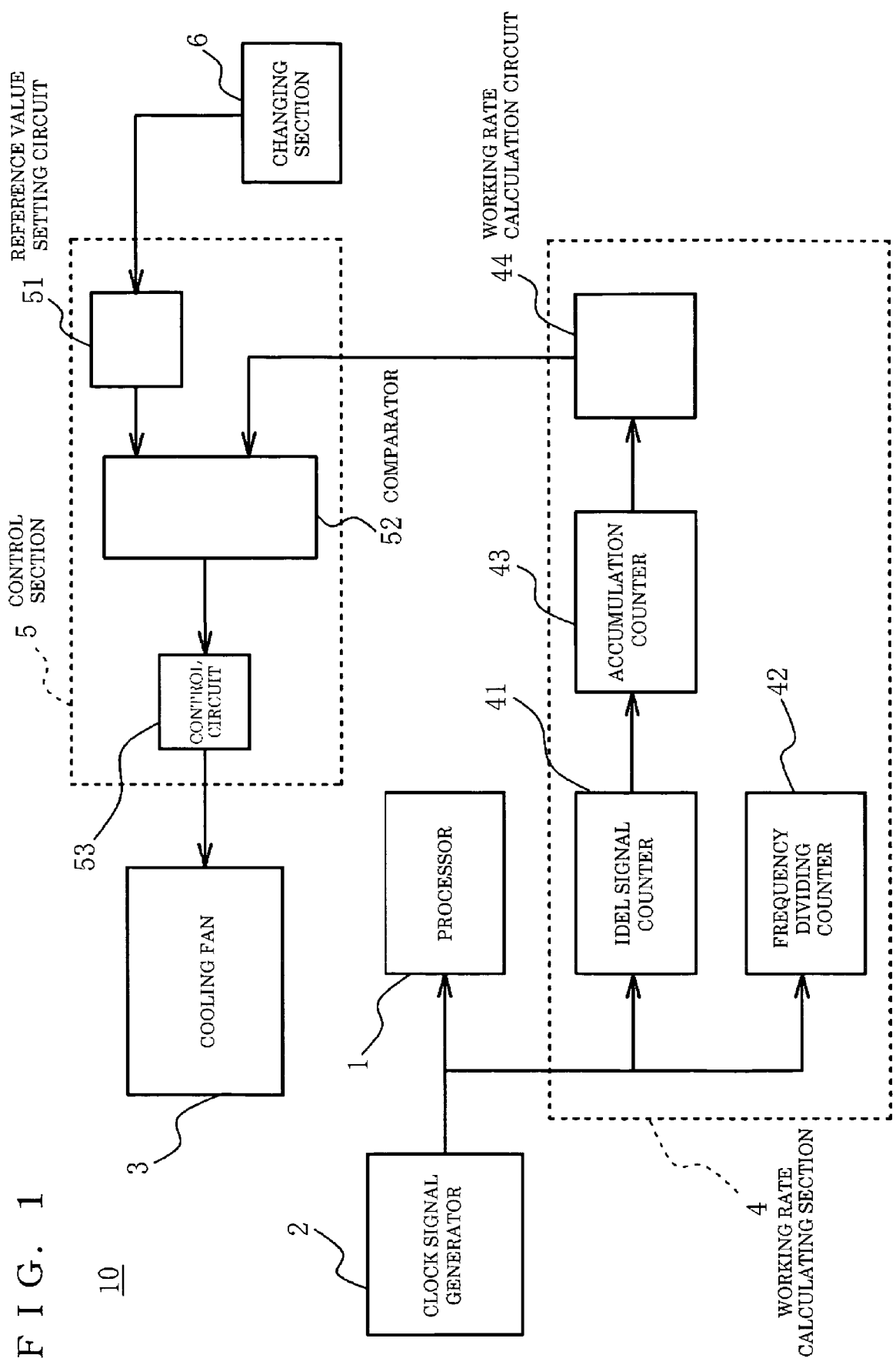
FIG. 1 is a block diagram showing the data processing device according to an example of the present invention.

A specific example of the present invention will be described in detail by using the embodiment and the drawings.

Embodiment 1

Description will be made for an embodiment of the present invention by using FIG. 1. FIG. 1 is a block diagram showing the data processing device according to the embodiment of the present invention.

Data processing device 10 is made up of: processor 1 formed of semiconductor, which executes data processing; a clock signal generator 2 that generates clock signals used for activating the processor 1; a cooling fan 3 that forcibly cools down the processor 1; a working rate calculating section 4 that calculates the working rate of the processor 1; a control section 5 that controls the cooling operation of the cooling fan 3 based on the calculated data from the working rate calculating section 4; and a changing section 6 that changes the setting conditions on which the cooling fan 3 is activated.

The working rate calculating section 4 is made up of: an idle signal counter 41 that counts idle signals obtained from the processor 1 when data processing is discontinued; a frequency dividing counter 42 that divides clock signals; an accumulation counter 43 that accumulates the count values from the idle signal counter 41 by using the output from the frequency dividing counter 42 during a predetermined period unit; and a working rate calculating circuit 44 that calculates the working rate based on the output from the accumulation counter 43 and transmits said calculated data.

The control section 5 is made up of: a reference value setting circuit 51 where a reference value as a predetermined value for activating the cooling fan 3 is set; a comparator 52 that compares the calculation data supplied from the working rate calculating section 4 with the reference value of the reference value setting circuit 51; and a control circuit 53 that is connected to the output side of the comparator 52 and activates the cooling fan 3 when the calculation data obtained in the working rate calculating section 4 reaches or exceeds the reference value.

The changing section 6 changes the reference value of the working rate between the period from operation start until a predetermined time and a point after that predetermined time has passed because actual temperature rise values between the point when power is supplied to the data processing device to start activation and the point where a considerable time has passed after the activating point are different. In this adjustment, a timer is activated from the operation start point, and a reference value for the reference value setting circuit 51 for before the predetermined time passes is set larger than the reference value for after the predetermined time has passed.

Next, the operation of the data processing device 10 with the cooling fan based on the above-described construction will be described.

When power is supplied to the data processing device 10 to start activation, the processor 1 performs data processing based on the clock signals from the clock signal generator 2. When the data processing is discontinued, idle signals are obtained from the processor 1. The idle signals are counted by the idle signal counter 41, and its output is supplied to the accumulation counter 43. The accumulation counter 43 accumulates the idle signals based on the output obtained by the frequency dividing counter 42 for a predetermined period unit. The accumulated output is converted into working rate calculation data by the working rate calculating circuit 44 and transmitted to the control section 5.

In the control section 5, the comparator 52 compares the calculation data supplied from the working rate calculating section 4 with the reference value from the reference value setting circuit 51. The control circuit 53 on the output side of the comparator 52 is designed not to allow the cooling fan 3 to activate when the working rate data is the reference value or less. When data processing is performed frequently to reduce the generation period of idle signals, the working rate calculating circuit 44 supplies the comparator 52 with calculation data showing that the working rate has increased. In the comparator 52 of the control section 5, calculation data showing the working rate corresponding to the temperature of the processor 1 is compared with the reference value, and the control circuit 53 activates the cooling fan 3 when the calculation data is higher than the reference value.

The cooling fan 3 forcibly cools down the processor 1 in this manner, and any abnormal rising temperature state is avoided. Accordingly, it is possible to continuously execute data processing. Further, when the actual period of executing data processing is shortened and the idle period is increased, the working rate is reduced to reduce the amount of calculation data calculated by the working rate calculating section 4, and when the fact that the calculation data has become the reference value or less in the control section 5 is detected, the control section 5 stops the cooling operation of the cooling fan 3.

Further, at the point when power is supplied to the data processing device 10 to start operation, the processor 1 is in a normal temperature state and needs to perform data processing for a sufficient number of times until it reaches high temperature. On the other hand, after a considerable time has passed from the operation start point, it is assumed that the temperature of the processor 1 will have already increased due to reasons such as repeated carrying out of data processing, and the processor will reach a high temperature at a lower working rate than in the above-described case where operation has just been started.

Therefore, the changing section 6 activates the timer from the operation start point of the processor 1, and changes the reference value that was set for after a predetermined time had passed to a value that is higher than the original reference value. Thus, at the point when the operation of the data processing device 10 has started, there is no need to activate the cooling fan 3 because the temperature of the processor 1 does not rise high enough during this period even if the working rate of data processing becomes high, and the calculation data does not reach the reference value either. However, even during this period, when data processing is executed continuously over a long period to increase the working rate and to increase the temperature of the processor 1, for example, the calculation data reaches the reference value and the cooling fan 3 is activated by the control section 5 to start forcible cooling.

After a predetermined time has passed from the point when power was supplied, the changing section 6 returns the reference value of the reference value setting circuit 51 to a steady state value. Then, the control section 5 activates the cooling fan 3 when the calculation data reaches the reference value. On the other hand, the control section 5 stops the operation of the cooling fan 3 when the calculation data reaches or drops below the reference value.

As described above, according to the example of the present invention, since the temperature rise of the processor 1 is interrelated with the working rate, the working rate calculating section 4 calculates the working rate and the level of temperature rise can be identified based on the calculated data. Hence, when the calculated data is transmitted to the control section 5 to compare it with the reference value and it equals or exceeds the reference value, the cooling fan 3 is activated. In this way temperature rise in processor 1 is avoided by the forcible cooling, and it is possible to continue original data processing even if the working rate reaches or exceeds the predetermined reference value. In short, data processing can be executed always within the maximum range of specifications. Further, the reference value from the activation start point to the predetermined time in the reference value setting circuit 51 is set by the changing section 6 to a higher value than the original reference value after a predetermined time has passed. Therefore, in data processing from the activation start of the data processing device 10 to the predetermined time, the cooling fan 3 is not activated even if the working rate is high because the temperature is not actually high enough. Since the reference value is reduced after the predetermined time has passed, the cooling fan 3 can be activated to correspond to the actual temperature rise. Consequently, the period when the cooling fan 3 is activated can be minimized, and power consumption is saved and generation of noise can be suppressed to a minimum.

Meanwhile, in the example of the present invention, the changing section 6 is designed to change the setting conditions for activating the cooling fan 3 by changing the reference value of the reference value setting circuit 51. However, the present invention is not limited to this, and various methods can be employed where the setting conditions are changed so as to change the conversion rate that is used for calculating the working rate as, for example in, the calculation data of the working rate calculating circuit 44.

Furthermore, in the example of the present invention, changing of the setting conditions is performed from the activation start until and after the predetermined time has passed. However, the present invention is not limited to this, and the setting conditions may be changed in phase during the period from activation start to the point when the predetermined time has passed. With this method, the operating period of the cooling fan can be shortened.

According to the first aspect of the invention, since the temperature rise of the processor is interrelated with the working rate, the working rate calculating means calculates the working rate, the control means activates the cooling fan when the rate reaches or exceeds a predetermined reference value to forcibly cool down the processor, and thus positively avoids the generation of an abnormal state. Therefore, firstly, the said processor can execute its original data processing within the maximum range of specifications to increase the working rate up to or in excess of the predetermined reference value even if the temperature rises. In other words, the invention can provide an efficient data processing device in which the processor can always process data at the maximum processing performance regardless of temperature rise. Secondly, affect of noise can be suppressed to the minimum because the cooling fan does not operate when the temperature of the processor is not high. Thirdly, the construction of the device is such as to calculate the working rate by applying the existing circuit, and the operation of the cooling fan is controlled based on the calculated result, and it is a cost-effective device capable of accurate control.

Furthermore, according to the second aspect of the present invention, the calculating means for working rate transmits the data of the working rate based on the idle signals generated from the processor itself in addition to the effect of the first aspect of the invention, so that it is possible to provide a data processing device that accurately obtains calculation data corresponding to the temperature of the processor without using a special temperature sensor or the like.

According to the third aspect of the present invention, since the temperature rise of the processor is interrelated with the working rate, the calculation means of the working rate calculates the working rate, the control means activates the cooling fan when the rate reaches or exceeds a predetermined reference value to forcibly cool down the processor, and thus positively avoids the generation of an abnormal state. Therefore, firstly, the processor can execute its original data processing within the maximum range of specifications even if the temperature rises to increase the working rate to the predetermined reference value or more. In other words, the invention can provide an efficient data processing device in which the processor can always process data at its maximum processing performance regardless of temperature rise. Secondly, affect of noise can be suppressed to a minimum because the cooling fan does not operate when the temperature of the processor is not high. Thirdly, the setting conditions for activating the cooling fan are changed from the operation start point up to and exceeding the predetermined time to deal with the actual temperature rise, so that the operation period of the cooling fan is minimized to save power consumption and the affect of noise can be suppressed to a minimum. Fourthly, the construction of the device is such as to calculate the working rate by applying the existing circuit, and the operation of the cooling fan is controlled based on the calculated result, and it is a cost-effective device capable of accurate control.

Furthermore, according to the fourth aspect of the present invention, the means of calculating the working rate transmits the data of working rate based on the idle signal generated from the processor itself in addition to the effect of the third aspect of the present invention, so that it is possible to provide a data processing device that accurately obtains calculation data corresponding to the temperature of the processor without using a special temperature sensor or the like.

What is claimed is:

1. A data processing device with a cooling fan to cool down a processor that performs data processing, said device comprising:

working rate calculating unit calculating the working rate of said processor, wherein said working rate calculating unit is made up of an idle signal counter that counts idle signals generating in said processor, an accumulation counter that accumulates count values of said idle signal counter for a predetermined period, and a working rate calculating circuit that calculates the working rate from the count value of said accumulation counter by converting an accumulated count values into said working rate by using a conversion rate, and transmits the calculation data;

control unit activating said cooling fan when the value of said working rate reaches or exceeds a reference value; and changing unit changing said conversion rate to a higher rate when a predetermined time has passed since the operation start point of said data processing, wherein said reference value forms setting conditions for starting activation of said cooling fan.

* * * * *